(12) United States Patent
Wang et al.

(10) Patent No.: US 9,537,789 B2
(45) Date of Patent: Jan. 3, 2017

(54) RESOURCE ALLOCATING IN A NETWORK

(71) Applicant: Raytheon Company, Waltham, MA (US)

(72) Inventors: Mu-Cheng Wang, Acton, MA (US); Paul C. Hershey, Ashburn, VA (US); Steven A. Davidson, Acton, MA (US)

(73) Assignee: RAYTHEON COMPANY, Waltham, MA (US)

(*) Notice: Subject to any disclaimer, the term of this patent is extended or adjusted under 35 U.S.C. 154(b) by 106 days.

(21) Appl. No.: 14/529,850

(22) Filed: Oct. 31, 2014

(65) Prior Publication Data
US 2016/0127257 A1   May 5, 2016

(51) Int. Cl.
*H04L 12/923* (2013.01)
(52) U.S. Cl.
CPC .................. *H04L 47/762* (2013.01)
(58) Field of Classification Search
CPC ... H04L 47/762; H04W 28/04; H04W 72/044; H04W 28/26
See application file for complete search history.

(56) References Cited

U.S. PATENT DOCUMENTS

| | | | |
|---|---|---|---|
| 5,381,404 A | 1/1995 | Sugano et al. | |
| 5,579,307 A | 11/1996 | Richetta et al. | |
| 5,754,543 A | 5/1998 | Seid | |
| 6,327,254 B1 | 12/2001 | Chuah | |
| 6,477,172 B1* | 11/2002 | Burger | H04Q 3/0016 370/230 |
| 6,535,482 B1 | 3/2003 | Hadi Salim et al. | |
| 6,981,055 B1 | 12/2005 | Ahuja et al. | |
| 8,059,620 B2 | 11/2011 | Moon | |
| 2002/0129086 A1 | 9/2002 | Garcia-Luna-Aceves et al. | |
| 2004/0103205 A1 | 5/2004 | Larson et al. | |
| 2004/0117474 A1 | 6/2004 | Ginkel et al. | |
| 2004/0165597 A1 | 8/2004 | Bicknell et al. | |
| 2005/0259610 A1 | 11/2005 | Demers et al. | |
| 2007/0064697 A1 | 3/2007 | Nesbitt et al. | |
| 2007/0104215 A1* | 5/2007 | Wang | H04L 12/5695 370/458 |
| 2007/0153808 A1 | 7/2007 | Parker et al. | |
| 2007/0211731 A1 | 9/2007 | Balandin et al. | |
| 2009/0138588 A1 | 5/2009 | Qian et al. | |

(Continued)

FOREIGN PATENT DOCUMENTS

DE    102 32 945       1/2004
EP    0 891 107 A1     1/1999

(Continued)

OTHER PUBLICATIONS

Canadian Examination Report dated Dec. 1, 2015 corresponding to Canadian Application No. 2,867,577; 3 Pages.

(Continued)

*Primary Examiner* — Mohammad Anwar
(74) *Attorney, Agent, or Firm* — Daly, Crowley, Mofford & Durkee, LLP (57) ABSTRACT

In one aspect, a method includes receiving, at a first node in a network, a resource reservation request from a second node in the network, determining, at the first node, if there is another node in the network that can be used to reach a destination and meet the resource reservation request and notifying the second node a result of the determining.

20 Claims, 5 Drawing Sheets

(56) References Cited

U.S. PATENT DOCUMENTS

| | | | |
|---|---|---|---|
| 2009/0141656 | A1 | 6/2009 | Fan et al. |
| 2009/0190477 | A1 | 7/2009 | Osborne |
| 2009/0228953 | A1 | 9/2009 | Hu et al. |
| 2009/0323700 | A1 | 12/2009 | Schwan et al. |
| 2011/0063977 | A1 | 3/2011 | Halfmann et al. |
| 2012/0134264 | A1 | 5/2012 | Ludwig et al. |
| 2013/0088970 | A1 | 4/2013 | Wang et al. |
| 2013/0127633 | A1 | 5/2013 | Hershey et al. |
| 2013/0250955 | A1 | 9/2013 | Wang et al. |
| 2013/0286957 | A1 | 10/2013 | Bucknell et al. |
| 2014/0011599 | A1 | 1/2014 | Garvey et al. |
| 2014/0279809 | A1 | 9/2014 | Hershey et al. |

FOREIGN PATENT DOCUMENTS

| | | |
|---|---|---|
| EP | 1 278 348 A1 | 1/2003 |
| EP | 2 096 804 A1 | 9/2009 |
| JP | 2003-244223 | 8/2003 |
| JP | 2003-338835 A | 11/2003 |
| JP | 2011-525767 A | 9/2011 |
| WO | WO 2005/079025 | 8/2005 |
| WO | WO 2010/063306 | 6/2010 |
| WO | WO 2013/052306 A1 | 4/2013 |

OTHER PUBLICATIONS

Final Office Action dated Dec. 3, 2015 for U.S. Appl. No. 13/827,029; 23 Pages.
Response to Office Action dated Sep. 14, 2015 for U.S. Appl. No. 14/109,059; Response filed on Dec. 7, 2015; 14 Pages.
Australian Examination Report No. 1 dated Mar. 17, 2015 corresponding to Australian Patent Appl. No. 2013235426; 3 Pages.
U.S. Final Office Action dated Mar. 25, 2016 corresponding to U.S. Appl. No. 14/109,059; 40 Pages.
Barthelemy et al., "Knowledge Representation Issues in Semantic Graphs for Relationship Detection;" UCRL-CONF-209845; 2005; 8 Pages.
Buchler et al., "The Warfighter Associate: Decision-Support and Metrics for Mission Command;" ARL-TR-6309, Army Research Laboratory; Jan. 2013; 56 Pages.
Dou et al., "Ontology-based Integration for Relational Databases;" Proceedings of the 2006 ACM Symposium on Applied Computing (SAC '06); Apr. 23-27, 2006; 6 Pages.
Gambold, "Unmanned Aircraft System Access to National Airspace;" Background Paper published by The Honourable Company of Air Pilots on <https://airpilots.org/aviation-matters/policy-and-comment/discussion-papers/>; Nov. 2011; 48 Pages.
Response to Japanese Office Action dated Sep. 25, 2015 corresponding to Japanese Application No. 2015-501788; Response filed on Mar. 25, 2016; 13 Pages.
Response to Singapore Written Opinion dated Nov. 4, 2014 corresponding to Singapore Application No. 11201401150V; Response filed on Apr. 6, 2015; 7 Pages.
Singapore Written Opinion dated May 20, 2015 corresponding to Singapore Application No. 11201401150V; 5 Pages.
European Examination Report dated Apr. 29, 2015 corresponding to European Application No. 12780938.2; 6 Pages.
Response to European Examination Report dated Apr. 29, 2015 corresponding to European Application No. 12780938.2; Response filed Sep. 8, 2015; 10 Pages.
Second European Examination Report dated Dec. 3, 2015 corresponding to European Application No. 12780938.2; 7 Pages.
Canadian Examination Report dated Jul. 30, 2015 corresponding to Canadian Application No. 2,850,478; 4 Pages.
Response to Canadian Examination Report dated Jul. 30, 2015 corresponding to Canadian Application No. 2,850,478; Response filed on Sep. 30, 2015; 13 Pages.
Response to Japanese Office Action dated May 11, 2015 corresponding to Japanese Application No. 2014-534595; Response filed on Aug. 14, 2015; 10 Pages.

Japanese Allowance Report dated Feb. 3, 2016 corresponding to Japanese Application No. 2014-534595;7 Pages.
Response to European Office Action dated Nov. 25, 2014 corresponding to European Patent Application No. 13714112.3; Response filed on Jun. 4, 2015; 5 Pages.
Japanese Patent Application No. 2014-534595 Office Action dated May 11, 2015, including English translation, 8 pages.
Office Action dated Jul. 6, 2015 corresponding to U.S. Appl. No. 13/827,029; 26 Pages.
Response to Office Action dated Jul. 6, 2015 corresponding to U.S. Appl. No. 13/827,029; Response filed on Sep. 15, 2015; 10 Pages.
Office Action dated Sep. 14, 2015 corresponding to U.S. Appl. No. 14/109,059; 40 Pages.
Adams, "The Predictive Battlespace, A Strategic Thought Paper;" TIBCO Software, Inc.; Jun. 19, 2007; 23 Pages.
Levchuk et al., "Analytic Model Driven Organizational Design and Experimentation in Adaptive Command and Control;" Systems Engineering, vol. 2, Issue 2; Aug. 23, 1999; 11 Pages.
Marques et al., "COA Modelling with Probabilistic Ontologies;" Proceedings of the $6^{th}$ International Conference on Semantic Technologies for Intelligence, Defense and Security (STIDS); Nov. 16-17, 2011; 8 Pages.
Zhang et al., "Generating Executable Capability Models for Requirements Validation;" Journal of Software, vol. 7, No. 9; Sep. 2012; 7 Pages.
PCT International Preliminary Report and Written Opinion dated Sep. 24, 2015 corresponding to International Application No. PCT/US2014/011599; 10 Pages.
Japanese Office Action (with English Translation) dated Sep. 25, 2015 for Japanese Application No. 2015-501788; 7 Pages.
Hida et al., "Implementation and Performance Evaluation of Traffic Engineering Scheme Based on Multiple Routing Tables;" Partial Translation; Technical Report of The Institute of Electronics, Information and Communication (IEICE), vol. 103, No. 692; Feb. 27, 2004; 12 Pages.
Response to Australian Examination Report dated Mar. 17, 2015 corresponding to Australian Patent Application No. 2013235426; Response filed on Oct. 28, 2015; 23 Pages.
Verma et al., "Precedence Based Preemption and Bandwidth Reservation Scheme;" International Journal of Computer Science Issues, vol. 9, Issue 6, No. 2; Nov. 2012; 6 Pages.
Jawhar et al., "A Dynamic Range Resource Reservation Protocol for QoS Support in Wireless Networks;" The $3^{rd}$ ACS/IEEE International Conference on Computer Systems and Applications; 2005; 8 Pages.
Sharma et al., "Agent Based Bandwidth Reservation Routing Technique in Mobile Ad Hoc Networks;" International Journal of Advanced Computer Science and Applications, vol. 2, No. 12; 2011; 6 Pages.
Elston et al., "Networked UAV Command, Control and Communication;" AIAA Guidance, Navigation, and Control Conference; Aug. 21-24, 2006; 9 Pages.
Wang et al., "A Design Method to Select Optimal Routes and Balance Load in Wireless Communication Networks;" MILCOM; 2013.
JBoss Drools Team, "Drools Documentation" (Part 1 of 3); Version 6.0.1 Final; http://www.drools.org/; 220 Pages.
JBoss Drools Team, "Drools Documentation" (Part 2 of 3); Version 6.0.1 Final; http://www.drools.org/; 220 Pages.
JBoss Drools Team, "Drools Documentation" (Part 3 of 3); Version 6.0.1 Final; http://www.drools.org/; 204 Pages.
Berry et al., "PPP over Ethernet (PPPoE) Extensions for Credit Flow and Link Metrics;" RFC Archive 5578; Feb. 2010; 24 Pages.
Mamakos et al., "A Method for Transmitting PPP Over Ethernet (PPPoE);" RFC Archive 2516; Feb. 1999; 16 Pages.
Simpson, "The Point-to-Point Protocol (PPP);" RFC Archive 1661; Jul. 1994; 48 Pages.
Berry et al., "PPP Over Ethernet (PPPoE) Extensions for Credit Flow and Link Metrics;" RFC Archive 4938; Jun. 2007; 16 Pages.
Wang et al., "Methods and Apparatus for Router-To-Radio Flow Control;" Corresponding to U.S. Appl. No. 13/269,100, filed Oct. 7, 2011; 22 Pages.

(56) References Cited

OTHER PUBLICATIONS

Office Action dated Jun. 20, 2013 corresponding to U.S. Appl. No. 13/269,100; 19 Pages.
Response to Office Action dated Jun. 20, 2013 corresponding to U.S. Appl. No. 13/269,100; Response filed Sep. 16, 2013; 10 Pages.
Final Office Action dated Dec. 5, 2013 corresponding to U.S. Appl. No. 13/269,100; 17 Pages.
Wang et al., "Guidelines for Sizing Traffic Queues in Terminals of Future Protected Satcom Systems;" Proceedings from the Military Communications Conference; 2009; 9 Pages.
Dye et al., "Network Fundamentals;" CCNA Exploration Companion Guide; Published by Cisco Press in Mar. 2009; 75 Pages.
Appeal Brief in Response to Office Action dated Dec. 5, 2013 corresponding to U.S. Appl. No. 13/269,100; Response filed Jun. 26, 2014; 15 Pages.
Examiner's Answer to Appeal Brief dated Aug. 12, 2014 corresponding to U.S. Appl. No. 13/269,100; 23 Pages.
Reply Brief in Response to Examiner's Answer dated Aug. 12, 2014 corresponding to U.S. Appl. No. 13/269,100; Reply filed Oct. 14, 2014; 10 Pages.
PCT Notification of Transmittal of the ISR and Written Opinion dated Jan. 18, 2013 corresponding to Appl. No. PCT/US2012/057004; 1 Page.
PCT International Search Report dated Jan. 18, 2013 corresponding to Appl. No. PCT/US2012/057004; 4 Pages.
PCT Written Opinion of the ISA dated Jan. 18, 2013 corresponding to Appl. No. PCT/US2012/057004; 9 Pages.
Lekcharoen et al., "An Adaptive Fuzzy Control Traffic Shaping Scheme Over Wireless Networks;" Proceedings of the Asia-Pacific Conference on Communications; Oct. 1, 2007; 6 Pages.
PCT Notification of Transmittal of IPR dated Apr. 17, 2014 corresponding to Appl. No. PCT/US2012/057004; 1 Page.
PCT International Preliminary Report dated Apr. 17, 2014 corresponding to Appl. No. PCT/US2012/057004; 1 Page.
PCT Written Opinion of the ISA dated Apr. 17, 2014 corresponding to Appl. No. PCT/US2012/057004; 7 Pages.
Singapore Search Report and Written Opinion dated Nov. 4, 2014 corresponding to Appl. No. 11201401150V; 11 Pages.
European Communication Persuant to Rules 161(1) and 162 EPC dated Jun. 6, 2014 corresponding to Appl. No. 12780938.2; 2 Pages.
Response to European Communication Persuant to Rules 161(1) and 162 EPC dated Jun. 6, 2014 corresponding to Appl. No. 12780938.2; Response filed on Dec. 16, 2014; 13 Pages.
Wang et al., "Routing a Data Packet in a Communication Network;" Corresponding to U.S. Appl. No. 13/827,029, filed Mar. 14, 2013; 17 Pages.
Office Action dated Nov. 3, 2014 corresponding to U.S. Appl. No. 13/827,029; 18 Pages.
Sun et al., "Dynamic Routing With Link State Information in ADNS and Future SATCOM Network;" Proceedings of the 2009 IEEE Military Communications Conference; Oct. 2009; 7 Pages.
Wang et al., "Design Consideration of Router-To-Radio Interface in Mobile Networks;" Proceedings of the 2011 IEEE Military Communications Conference; Nov. 2011; 6 Pages.
Percy, "Understand Latency in IP Telephony;" Telephony World; http://www.telephonyworld.com/training/brooktrout/iptel_latency_wp.html; 10 Pages.
"Implementing EIGRP on Cisco IOS XR Software;" Cisco Document; http://cisco.com/en/US/docs/ios_xr_sw/iosxr_r3.7/routing/configuration/guide/rc37egp.pdf; 35 Pages.
Psenak et al., "Multi-Topology (MT) Routing in OSPF;" RFC Archive 4915; Jun. 2007; 20 Pages.
"Multi-Topology Routing;" Cisco Document; http://www.cisco.com/en/US/docs/ios/mtr/configuration/guide/multi-top_rtng.pdf; 68 Pages.
PCT Notification of Transmittal of the ISR and Written Opinion dated Jul. 1, 2013 corresponding to Appl. No. PCT/US2013/031714; 1 Page.
PCT International Search Report dated Jul. 1, 2013 corresponding to Appl. No. PCT/US2013/031714; 4 Pages.

PCT Written Opinion of the ISA dated Jul. 1, 2013 corresponding to Appl. No. PCT/US2013/031714; 6 Pages.
PCT Notification of Transmittal of IPR dated Oct. 2, 2014 corresponding to Appl. No. PCT/US2013/031714; 1 Page.
PCT International Preliminary Report dated Oct. 2, 2014 corresponding to Appl. No. PCT/US2013/031714; 1 Page.
PCT Written Opinion of the ISA dated Oct. 2, 2014 corresponding to Appl. No. PCT/US2013/031714; 6 Pages.
European Communication Persuant to Rules 161(1) and 162 EPC dated Nov. 25, 2014 corresponding to Appl. No. 13714112.3; 2 Pages.
Hershey et al., "Data Broker Reasoner;" Corresponding to U.S. Appl. No. 14/109,059, filed Dec. 17, 2013; 24 Pages.
Hershey et al., "Procedure for Detection of and Response to Distributed Denial of Service Attacks on Complex Enterprise Systems;" Proceedings of the 2012 IEEE Systems Conference; Mar. 20, 2012; 6 Pages.
Hershey et al., "Monitoring and Response for Real-Time Voice Messages Transmitted Using Wi-Fi Within Net-Centric Enterprise Systems;" Proceedings of MILCOM 2010; Nov. 3, 2010; 6 Pages.
Hershey et al., "Real-time Communications Resource Allocation Process, Architecture, and Algorithm;" Proceedings of MILCOM 2013; Nov. 19, 2013; 6 Pages.
Hershey et al., "End-to-End Applications and Algorithm Integration (E2A2I) Method and Architecture;" Proceedings of MILCOM 2013; 6 Pages.
Hershey et al., "System of Systems for Autonomous Mission Decisions;" Proceedings of the 2013 IEEE International Systems to Systems Engineering Conference; Jun. 5, 2013; 6 Pages.
Hershey et al., "Composable, Distributed System to Derive Actionable Mission Information from Intelligence, Surveillance, and Reconnaissance (ISR) Data;" Proceedings of the 2013 IEEE Systems Conference; Apr. 17, 2013; 8 Pages.
Hershey, "Automated Data Reduction Method for Intelligence, Surveillance, and Reconnaissance Systems;" Proceedings of the Royal Canadian Air Force Avionics and Systems Workshop; Dec. 2012; 13 Pages.
Hershey et al., "A Policy-Based Approach to Automated Data Reduction for Intelligence, Surveillance, and Reconnaissance Systems;" Proceedings of MILCOM 2012; Oct. 29, 2012; 6 Pages.
Hershey et al., "Context Switching System and Architecture for Intelligence, Surveillance, and Reconnaissance;" Proceedings of SPIE, vol. 8360, 83600E-1-83600E-8; Apr. 2012; 8 Pages.
Uszok et al., "KAoS Policy and Domain Services: Toward a Description-Logic Approach to Policy Representation, Deconfliction, and Enforcement;" Proceedings of the IEEE $4^{th}$ International Workshop on Policies for Distributed Systems and Networks; Jan. 2003; 12 Pages.
Bunch et al., "Regulating the Exchange of Tactical Military Information Using the KAoS Policy Services Framework;" Army Research Laboratory: Advanced Decision Architectures for the Warfighter; Jan. 2009; 21 Pages.
Suri et al., "DAML-Based Policy Enforcement for Semantic Data Transformation and Filtering in Multi-Agent Systems;" Proceedings of the $2^{nd}$ International Joint Conference on Autonomous Agents and Multiagent Systems (AAMS); Jan. 2003; 8 Pages.
Pham et al., "Intelligence, Surveillance, and Reconnaissance Fusion for Coalition Operations;" Proceedings of the $11^{th}$ International Conference on IEEE; Jun. 30, 2008; 8 Pages.
PCT Notification of Transmittal of the ISR and Written Opinion dated Oct. 22, 2014 corresponding to Appl. No. PCT/US2014/011599; 1 Page.
PCT International Search Report dated Oct. 22, 2014 corresponding to Appl. No. PCT/US2014/011599; 4 Pages.
U.S. Appl. No. 13/454,568; U.S. Publication No. 2013/0127633; 154 Pages.
U.S. Appl. No. 13/269,100; 265 Pages.
U.S. Appl. No. 13/269,100; 256 Pages.
U.S. Appl. No. 13/827,029; 333 Pages.
U.S. Appl. No. 14/109,059; 367 Pages.
Response (with Amended Claims and Specification) to European Office Action dated Dec. 3, 2015 for European Application No. 12780938.2; Response filed on Apr. 13, 2016; 15 Pages.

(56) References Cited

OTHER PUBLICATIONS

Canadian Office Action dated May 2, 2016 for Canadian Application No. 2,850,478; 4 Pages.
Singapore Supplementary Examination Report dated Jun. 15, 2016 for Singapore Application No. 11201401150V; 2 Pages.
U.S. Patent Board Decision on Appeal dated Jul. 25, 2016 for U.S. Appl. No. 13/269,100; 12 Pages.
Response (with Amended Specification and Claims) to Canadian Examiner's Report dated Dec. 1, 2015 for Canadian Application No. 2,867,577; Response filed on May 24, 2016; 12 Pages.
Request for Reconsideration (RCE) and Response to Final Office Action dated Dec. 3, 2015 for U.S. Appl. No. 13/827,029; RCE and Response filed on Jun. 3, 2016; 15 Pages.
U.S. Office Action dated Jul. 29, 2016 corresponding to U.S. Appl. No. 14/109,059; 33 Pages.
U.S. Office Action dated Aug. 2, 2016 corresponding to U.S. Appl. No. 13/827,029; 22 Pages.

* cited by examiner

RESOURCE ALLOCATING IN A NETWORK

BACKGROUND

A communication network includes multiple routers. The routers are located at subnet boundaries that are located between a sender and a receiver. The routers transfer data packets originating from the sender to the intended receiver. Often a communication network has multiple possible paths between the sender and the receiver, but only one single path is chosen to send data between the sender and the receiver.

SUMMARY

In one aspect, a method includes receiving, at a first node in a network, a resource reservation request from a second node in the network, determining, at the first node, if there is another node in the network that can be used to reach a destination and meet the resource reservation request and notifying the second node a result of the determining.

In another aspect, a first node in a network includes electronic hardware circuitry configured to receive a resource reservation request from a second node in the network, determine if there is another node in the network that can be used to reach a destination and meet the resource reservation request and notify the second node a result of the determining.

In a further aspect, an article includes a non-transitory computer-readable medium that stores computer-executable instructions. The instructions cause a machine to receive, at a first node in a network, a resource reservation request from a second node in the network, determine, at the first node, if there is another node in the network that can be used to reach a destination and meet the resource reservation request and notify the second node a result of the determining.

DETAILED DESCRIPTION

Described herein are techniques to allocate resources at a node in a network to accomplish an objective (e.g., a mission). For example, the bandwidth of a node in the network is allocated to accomplish an objective. Also described herein are techniques to modify a resource allocation due to a detected link failure or link degradation and to perform a resource re-evaluation. Using these techniques, if the nodes in the network are aerial platforms that are deployed, any changes due to link failure or link degradation between the nodes may be adjusted in real-time while the nodes are still deployed without a need to recall these nodes thereby saving time and money.

Figure 1A:
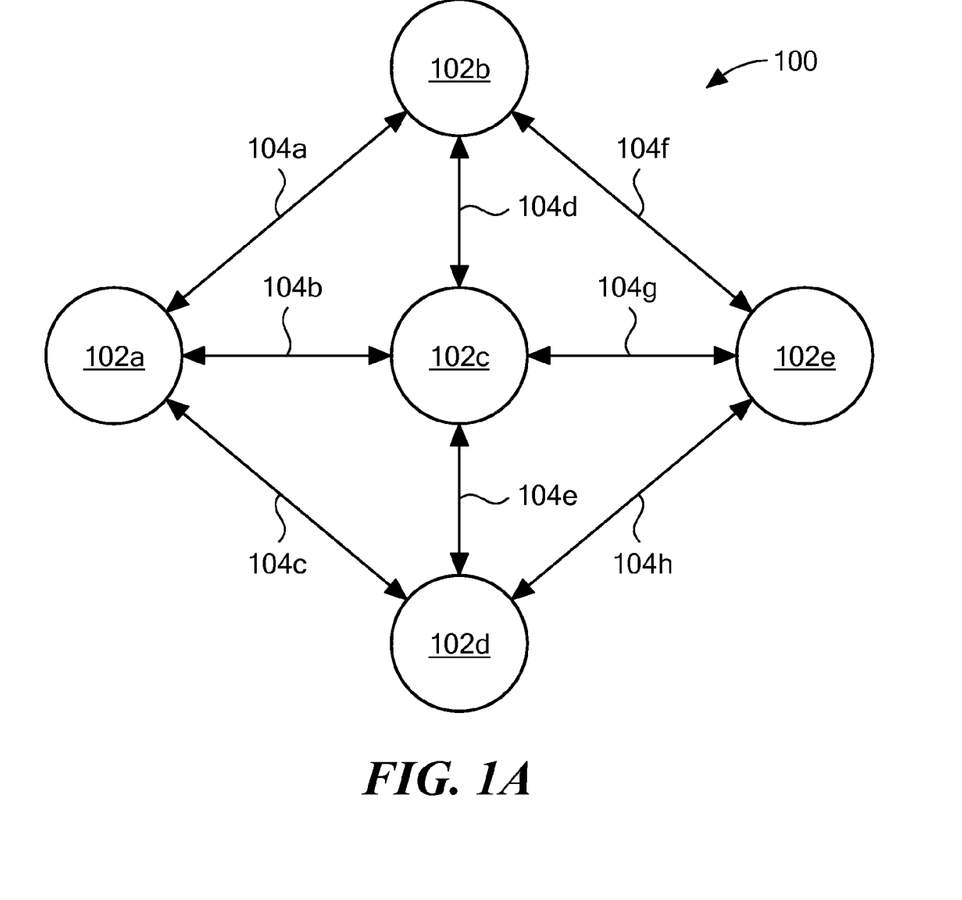
FIG. 1A is a block diagram of an example of a network.

Referring to FIG. 1A, a network 100 used for communications includes nodes 102a-102e. The node 102a is coupled to the node 102b by a link 104a, is coupled to the node 102c by a link 104b and is coupled to the node 102d by the link 104c. The node 102b is coupled to the node 102c by a link 104d and is coupled to the node 102e by a link 104f. The node 102c is coupled to the node 102d by a link 104e and is coupled to the node 102e by a link 104g. The node 102d is coupled to the node 102e by a link 104h. Each of the links 104a-104h may be one of wired links, fiber optic links, wireless links or a combination of the three (or any other media that can carry IP or other digitally encoded data traffic). In some examples, the nodes 102a-102e form a multi-layered hierarchical mobile ad-hoc network (MANET). Although MANET can potentially offer multiple routes for each given source and destination pair, each network node selects an "appropriate" communications path which can satisfy the mission requirements, such as jitter, latency, and minimum bandwidth. As can be observed in FIG. 1A, there are a number of paths between the nodes 102a and 102e that data packets can travel.

Figure 1B:
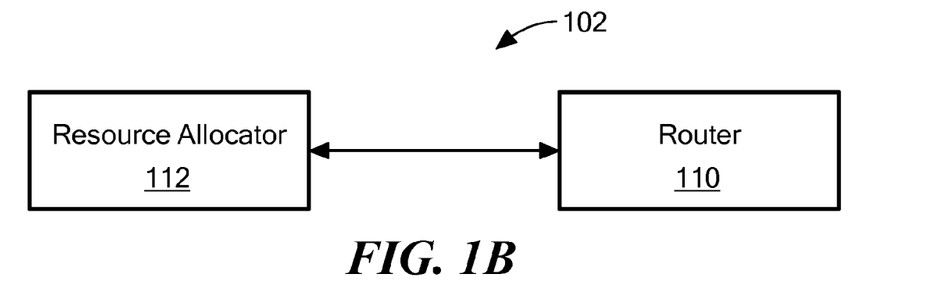
FIG. 1B is a block diagram of an example of a node in the network of FIG. 1A.

Referring to FIG. 1B, a node 102 is an example of one or more of the nodes 102a-102e. The node 102 includes a router 110 and a resource allocator 112. In some examples, the router 110 provides link updates and resource requests. In some examples, the router 110 performs packet forwarding according to the packet's destination address and enforces the Quality of Service (QoS) policies at the egress interfaces. In some examples, the resource allocator 112 manages resource (e.g., bandwidth) allocation for the router 110, monitors quality of links for the router and if needed performs resource redistribution. In one example, a node 102 is an aerial platform (e.g., an unmanned aerial vehicle). In one particular example, one or more nodes 102a-102e in the network 100 is (are) unmanned aerial vehicles.

Figure 2:
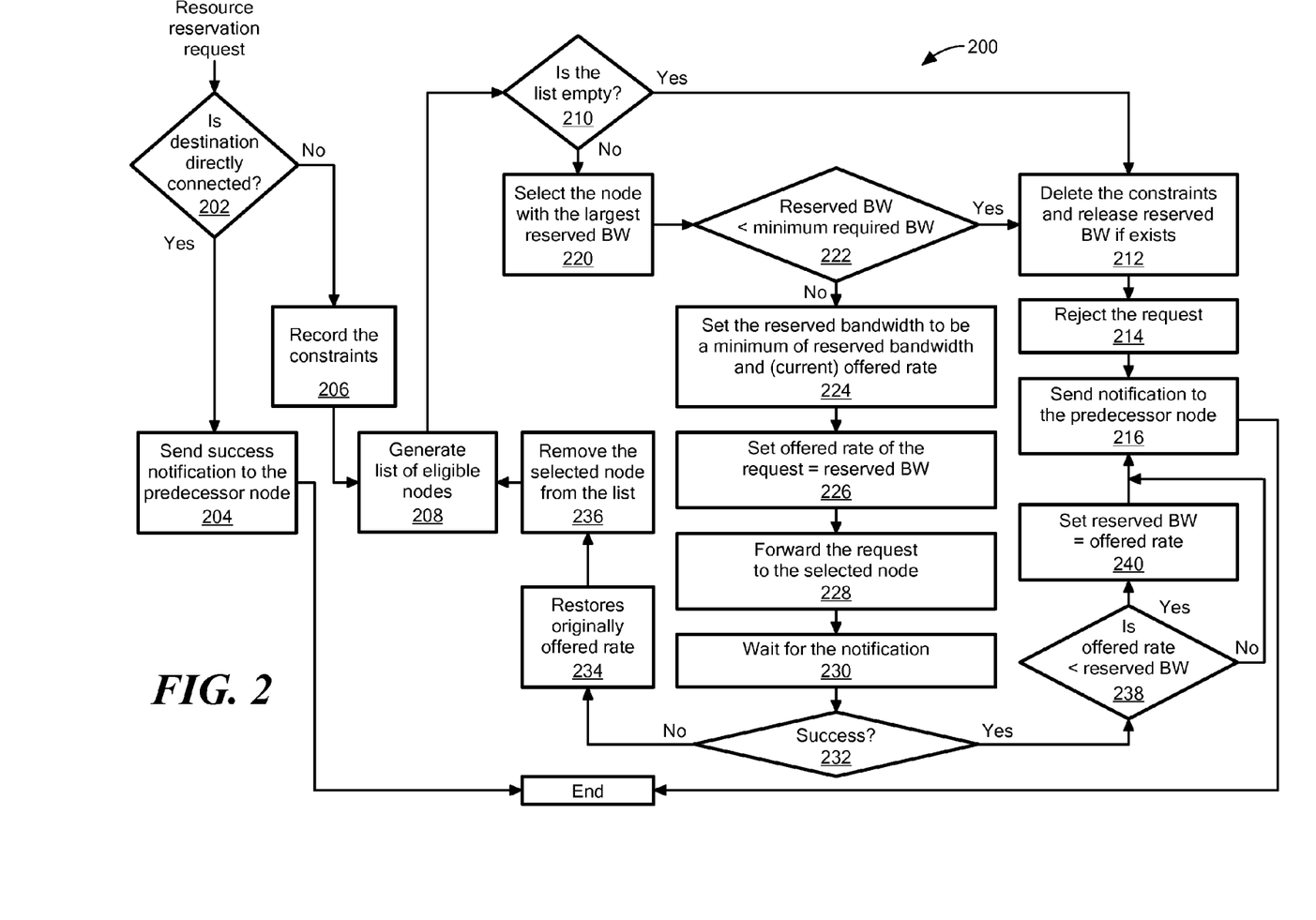
FIG. 2 is a flowchart of an example of a process to perform resource allocation.

Referring to FIG. 2, a process 200 is an example of a process to perform resource allocation and in particular, performing bandwidth allocation. For example, process 200 is performed by nodes along a communications path (sometimes referred to herein as a route). In one particular example, node 102a is a source node and node 102e is the destination node. Node 102c is chosen by the node 102a using the process 200 so that the communications path is from node 102a to node 102c to node 102e. With respect to node 102c, the node 102a would be its predecessor node and with respect to node 102a, the node 102c would be its successor node.

After receiving a resource reservation request, process 200 determines if a destination node is directly connected (202) and if the destination node is directly connected, process 200 sends a success notification to the predecessor node (204), for example, including the latest offered rate, to the sender of the resource reservation request. The offered rate is defined to be the bandwidth which all the eligible nodes in the path will reserve for a mission. Initially, the offered rate is set to be the desired bandwidth of the mission. The offered rate can be modified during the route selection process. A node is an eligible node if it can reach the destination node directly or indirectly and satisfy the resource constraints (e.g., jitter, latency, security) of the mission and bandwidth requirements of the mission.

If the destination node is not directly connected, process 200 stores the resource constraints of the mission (206), in a database (e.g., data 518 in FIG. 5), for example. For example, the resource constraints may include latency, minimum bandwidth requirement, security, jitter, and other constraints as defined by the mission requirements. In one example, the resource constraints are included in the reservation request.

Process 200 generates a list of eligible nodes (208). For example, process 200 generates a list of neighbors (e.g., eligible nodes that are one hop away) to forward the resource reservation request that meet the resource constraints. For example, if process 200 is being executed at the node 102*a*, the eligible nodes may include nodes 102*b*-102*d*.

Process 200 determines if the list is empty (210) and if the list is empty, process 200 deletes the constraints and releases reserved bandwidth if it exists (212). Process 200 rejects the resource reservation request (214) and sends a notification to the predecessor node (216) (i.e., the predecessor node is the node that sent the resource reservation request).

If the list is not empty, process 200 selects the node with the largest reserved bandwidth (220). Process 200 determines if the reserved bandwidth is less than the minimum required bandwidth (222). If the reserved bandwidth is less than the minimum required bandwidth, process 200 performs processing blocks 212, 214 and 216.

If the reserved bandwidth is not less than the minimum required bandwidth process 200, process 200 sets the reserved bandwidth to be the minimum of reserved bandwidth and (current) offered rate (224) and sets the offered rate of the request equal to the reserved bandwidth (226). Process 200 forwards a resource reservation request to the selected node (228) and waits for notification (230).

Process 200 determines if the resource reservation request is successful (e.g., a notification is received from the selected node that the bandwidth is reserved) (232). If not successful, process 200 restores the originally offered rate (234) and removes the selected node from the list (236) and repeats processing block 208.

If successful, process 200 determines if the offered rate is less than the reserved bandwidth (238). If the offered rate is less than the reserved bandwidth, process 200 sets the reserved bandwidth equal to the offered rate (240) and performs processing block 216. If the offered rate is not changed, process 200 performs processing block 216.

Once process 200 is completed successfully by each node in the selected path, the nodes in the selected path guarantee a bandwidth to this mission regardless of its priority level. Bandwidth reallocation occurs when the link situation changes, such as link failure or quality degradation (e.g., process 300 (FIG. 3)). Process 200 both helps the communication networks serve the missions better, i.e., select a path to match the resource requirements the best, and improves the network utilization (e.g., reduce the packet drops due to the insufficient bandwidth).

Although beneficial to the mission, process 200 is not mandatory. Missions are allowed to deliver traffic without performing process 200 in advance. A node can still forward the traffic received as long as there is unused bandwidth available. However, the priority is given to the missions that have completed process 200. Missions that do not complete process 200 compete for the remaining unclaimed bandwidth. Without knowing the mission bandwidth requirement, a node performs the route selection based on the destination address if standard routing protocols, such as Open Shortest Path First (OSPF), Enhanced Interior Gateway Routing Protocol (EIGRP), Border Gateway Protocol (BGP), for example, are used. Combining a traditional routing process with the process 200 enables a mission-requirements-based decision as to whether or not the resulting path may or may not meet the mission's bandwidth requirement.

Figure 3:
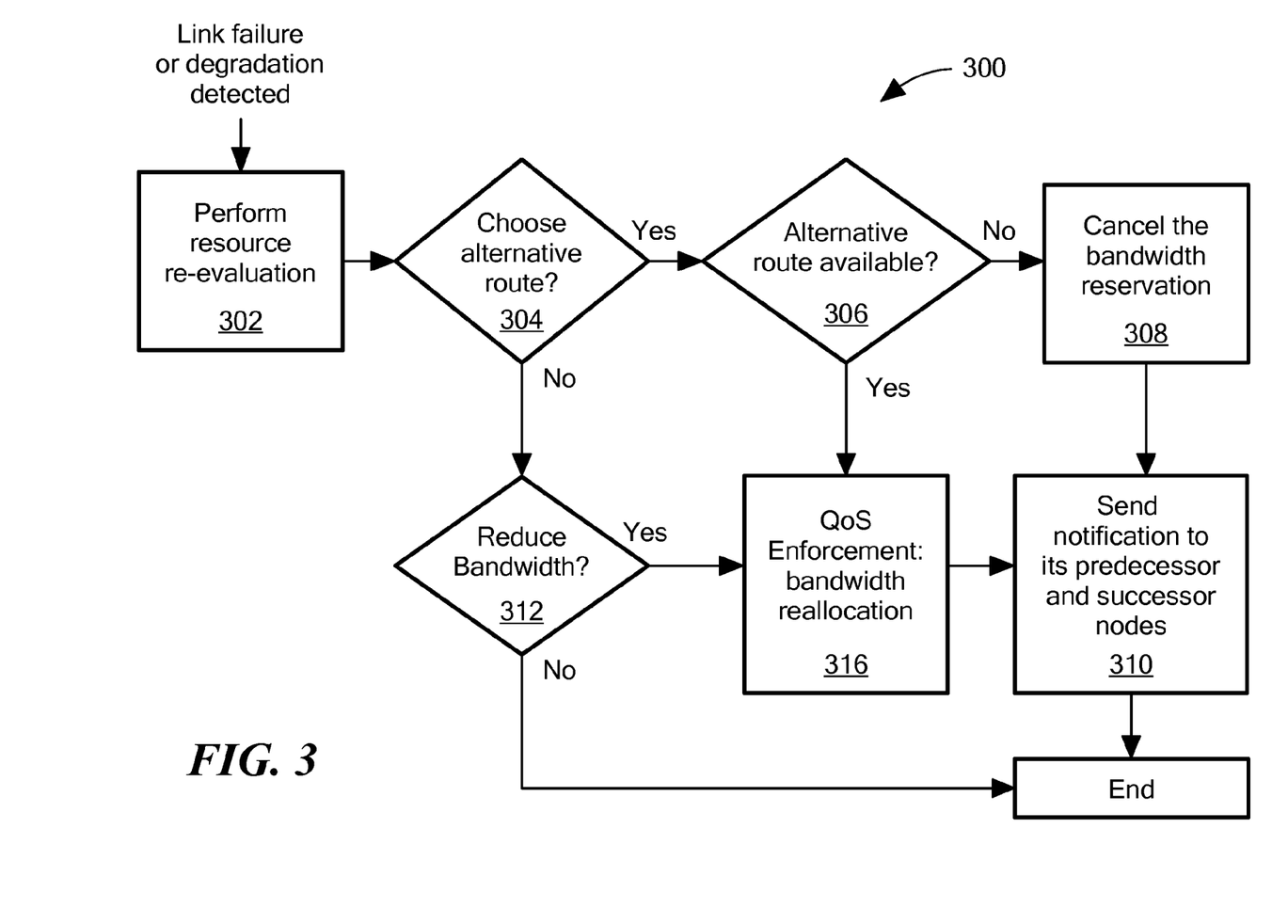
FIG. 3 is a flowchart of an example of a process to manage resource allocation after a detected link failure or detected degradation.

Referring to FIG. 3, a process 300 is an example of a process to manage resource allocation after a detected link failure or detected degradation. For example, the resource allocator 112 in FIG. 1B monitors the link conditions and senses that the link quality no longer supports the existing mission requirements or that there is a link failure. After a link failure or link degradation process 300 is performed.

Process 300 performs a resource re-evaluation (302) and determines if a new alternate route be chosen (304). For example, a process 400 (FIG. 4) is performed to re-evaluate whether there is adequate bandwidth at the node.

If a new route should be chosen, process 300 determines if alternate routes are available (306). For each alternative link being considered, both the data on the failed or saturated link and the data on the alternative link are assessed. The total capability should at least satisfy the sum of the minimum bandwidth requirement of all traffic flows which go through this link.

If alternate routes are not available, process 300 cancels the bandwidth reservation (308) and sends a notification to its predecessor nodes and its successor nodes (310). If alternate routes are available, process 300 performs a bandwidth reallocation (316) and sends a notification to its predecessor nodes and its successor nodes (310).

For example, after the reevaluation, if a node determines that it can no longer satisfy the minimum bandwidth requirement of a mission, then it will cancel its bandwidth reservation, i.e., release the bandwidth reserved for this mission, remove the corresponding mission requirements information from its local database, and send a cancellation notification to its predecessor and successor nodes in the path.

Upon receiving a reservation cancellation from its predecessor node in the path, a node will release the bandwidth reserved for this mission, remove the corresponding mission requirements information from its local database, and send a cancellation notification to its successor nodes in the path.

Upon receiving a reservation cancellation from its successor node in the path, a node will search alternative eligible neighbors based on link quality, present mission constraints, and bandwidth requirements. If at least one eligible neighboring node can satisfy the mission requirements, this mission will continue. The node selects the link with the highest offered bandwidth and sends a reservation request to the selected neighbor on behalf of the source to establish a new path. If none of the eligible neighbors can satisfy the mission requirements, then this mission will be cancelled.

If a new route need not be chosen, process 300 determines if bandwidth should be reduced (312) and, if bandwidth should be reduced, process 300 performs bandwidth reallocation (316) and sends a notification to its predecessor nodes and its successor nodes (310).

To avoid the packet delivery interruption due to the path change and save the path reestablishment time, the preferred choice is to reduce the reserved bandwidth in order to keep the traffic flow on the same link. For each mission, the revised bandwidth reservation should still meet the mission's minimum bandwidth requirement. The actual value is dependent on the current link capacity, sum of bandwidth requirements from all the missions which have completed the resource reservation, and the mission's priority. Note that if multiple missions are involved in the re-evaluation process, then the missions with the strict priority will be served first and then others after that, according to their priority setting. If no sufficient bandwidth is available for a mission, then the mission data will be rerouted. Under this situation, the minimum bandwidth requirement specified in a mission profile is allocated to a mission initially. If there is remaining bandwidth available after the allocation, then the mission data will be distributed to other missions according to their weight and need.

Figure 4:
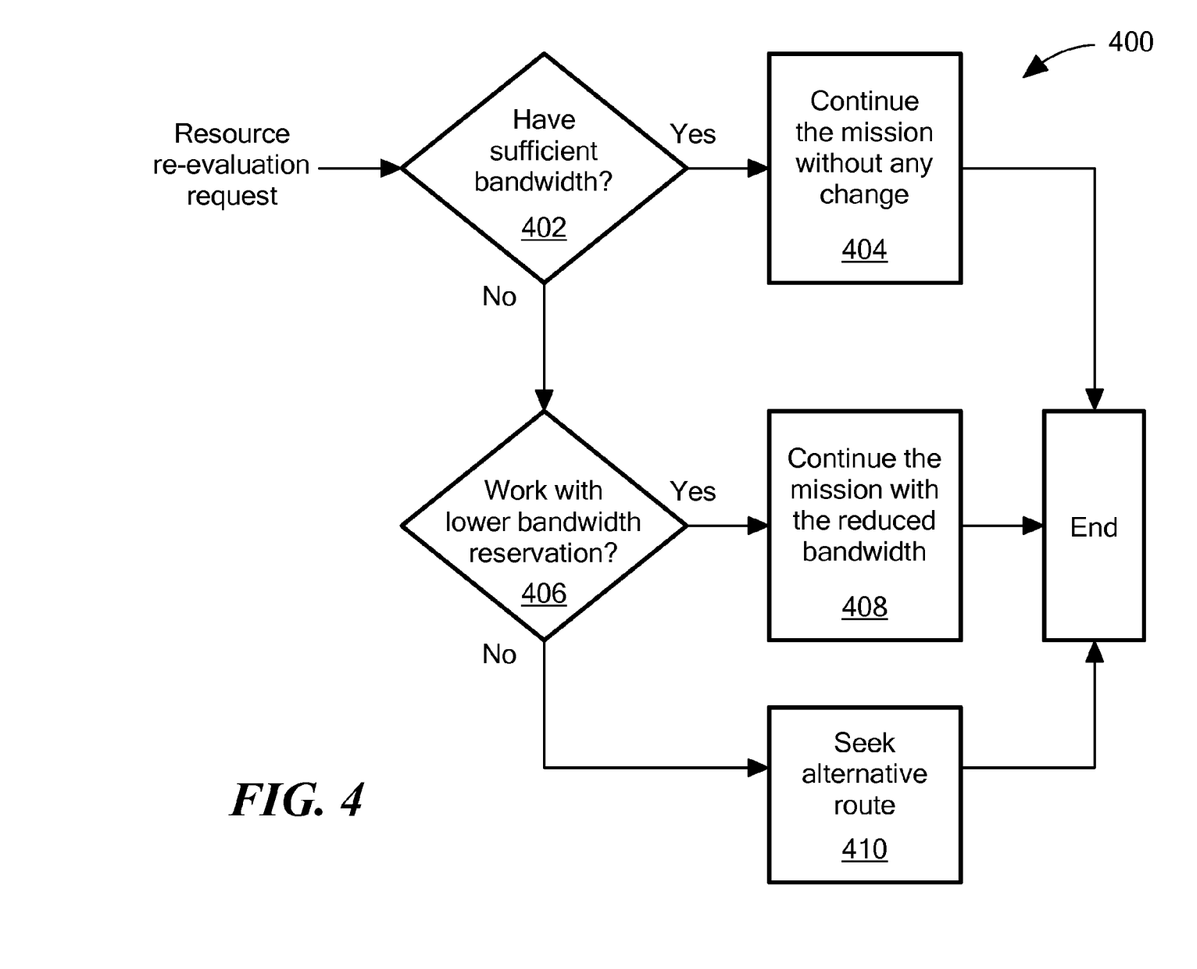
FIG. 4 is a flowchart of an example of a process to perform a re-evaluation of a resource allocation.

Referring to FIG. 4, a process 400 is an example of a process to perform a re-evaluation of resource allocation. For example, after being notified of a link failure or degradation, the process 400 is performed to re-evaluate the resource allocation.

Process 400 determines if there is sufficient bandwidth to support the existing missions (402) and if there is sufficient bandwidth process 400 continues the mission without any change (404). If process 400 determines there is not sufficient bandwidth, process 400 determines if a lower bandwidth reservation will be acceptable (406).

If a lower bandwidth reservation is acceptable, process 400 continues mission with reduced bandwidth (408). If a lower bandwidth reservation is not acceptable, process 400 seeks alternate routes (410).

Figure 5:
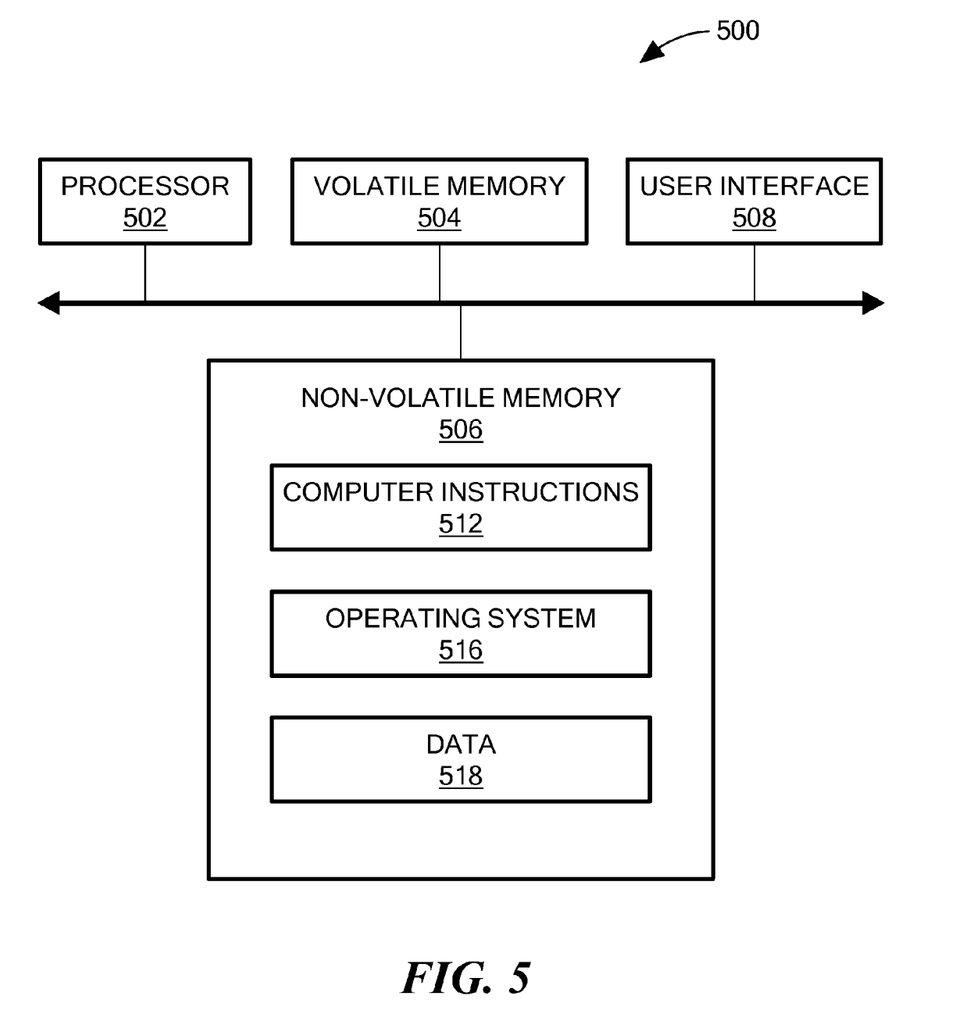
FIG. 5 is a block diagram of an example of a resource allocator of the node in FIG. 1B on which any or part of the processes of FIGS. 2 to 4 may be implemented.

Referring to FIG. 5, an example of the resource allocator 112 is the resource allocator 500. The resource allocator 500 includes a processor 502, a volatile memory 504, a non-volatile memory 506 (e.g., hard disk) and the user interface (UI) 508 (e.g., a graphical user interface, a mouse, a keyboard, a display, touch screen and so forth). The non-volatile memory 506 stores computer instructions 512, an operating system 516 and data 518. In one example, the computer instructions 512 are executed by the processor 502 out of volatile memory 504 to perform all or part of the processes described herein (e.g., processes 200, 300 and 400).

The processes described herein (e.g., processes 200, 300 and 400) are not limited to use with the hardware and software of FIG. 5; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to work with the rest of the computer-based system. However, the programs may be implemented in assembly, machine language, or Hardware Description Language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 200, 300 and 400 are not limited to the specific processing order of FIGS. 2 to 4 respectively. Rather, any of the processing blocks of FIGS. 2 to 4 may be re-ordered, combined or removed, performed in parallel or in serial, as necessary, to achieve the results set forth above.

In some examples, multiple routing tables may be combined in to a single routing table. In these examples, value-to-route associations are incorporated (directly or indirectly) into the combined routing table thereby enabling the appropriate route selection to be made.

The processing blocks (for example, in the processes 200, 300 and 400) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, programmable logic devices or logic gates.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method comprising:
receiving, at a first node in a network, a resource reservation request from a second node in the network, wherein the resource reservation request is a request for bandwidth to satisfy a bandwidth requirement of a mission;
determining, at the first node, if there is an eligible node in the network that can be used to reach a destination and meet the resource reservation request, wherein the eligible node is capable of:
reaching the destination directly or indirectly,
satisfying a resource constraint of the mission, the resource constraint comprising at least one of jitter, latency or security and
satisfying the bandwidth requirement of the mission; and
notifying the second node a result of the determining comprising notifying the second node of a latest offered rate if the first node is an eligible node, wherein the offered rate is a bandwidth which the eligible node will reserve for the mission.

2. The method of claim 1, wherein the determining comprises:
   storing the resource constraint of the resource reservation request at the first node;
   selecting a third node in the network from a set of eligible nodes with the largest reserved bandwidth;
   setting the reserved bandwidth to be the minimum of currently reserved bandwidth and a current offered rate;
   setting an offered rate of the resource reservation request equal to the reserved bandwidth of the third node; and
   forwarding the resource reservation request to the third node.

3. The method of claim 2, wherein the determining further comprises:
   setting the reserved bandwidth equal to the offered rate if the offered rate is less than the reserved bandwidth; and
   sending a notification to the second node with a value of the reserved bandwidth.

4. The method of claim 3, further comprising:
   receiving notification that a link is degraded or has failed;
   performing a resource re-evaluation;
   reducing bandwidth if the mission may be still completed using the link;
   cancelling the reserved bandwidth if another route is not available and if the mission may not be completed using the link; and
   notifying the second node and the third node of the bandwidth change.

5. The method of claim 4, wherein performing the resource re-evaluation comprises:
   determining if there is bandwidth to perform the mission;
   determining if the mission may be completed using a lower bandwidth than previously reserved if there is not bandwidth to perform the mission; and
   seeking an alternate route if the mission may not be completed using a lower bandwidth.

6. The method of claim 2, wherein the determining further comprises, if the third node indicates a failure to reserve the bandwidth:
   restoring the originally offered rate; and
   removing the third node from the set of eligible nodes.

7. The method of claim 2, further comprising:
   receiving, at a third node in the network, a resource reservation request from a first node in the network;
   determining, at the third node, if there is an eligible node in the network that can meet the resource reservation request; and
   notifying the first node a result of the determining.

8. The method of claim 1, further comprising:
   establishing a priority for the resource reservation request based on the resource constraint; and
   dynamically readjusting the priority of the resource reservation request in real-time in response to changes in the mission.

9. A first node in a network, comprising:
   electronic hardware circuitry configured to:
      receive a resource reservation request from a second node in the network, wherein the resource reservation request is a request for bandwidth to satisfy a bandwidth requirement of a mission;
      determine if there is an eligible node in the network that can be used to reach a destination and meet the resource reservation request, wherein the eligible node is capable of:
         reaching the destination directly or indirectly,
         satisfying a resource constraint of the mission, the resource constraint comprising at least one of jitter, latency or security and
         satisfying the bandwidth requirement of the mission; and
      notify the second node a result of the determining comprising notifying the second node of a latest offered rate if the first node is an eligible node, wherein the offered rate is a bandwidth which the eligible node will reserve for the mission.

10. The first node of claim 9 wherein the circuitry comprises at least one of a processor, a memory, a programmable logic device or a logic gate.

11. The first node of claim 9, wherein the circuitry configured to determine comprises circuitry configured to:
   store the resource constraint of the resource reservation request at the first node;
   select a third node in the network from a set of eligible nodes with the largest reserved bandwidth;
   set the reserved bandwidth to be the minimum of currently reserved bandwidth and a current offered rate;
   set an offered rate of the resource reservation request equal to the reserved bandwidth; and
   forward the resource reservation request to the third node.

12. The first node of claim 11, further comprising circuitry configured to:
   receive notification that a link is degraded or has failed;
   perform a resource re-evaluation;
   reduce bandwidth if the mission may be still completed using the link; and
   cancel the reserved bandwidth if another route is not available and if the mission may not be completed using the link.

13. The first node of claim 12, further comprising circuitry configured to:
   notify the second node and the third node of the bandwidth change;
   determine if there is bandwidth to perform the mission;
   determine if the mission may be completed using a lower bandwidth than previously reserved if there is not bandwidth to perform the mission; and
   seek an alternate route if the mission may not be completed using a lower bandwidth.

14. The first node of claim 9, further comprising circuitry configured to:
   establish a priority for the resource reservation request based on the resource constraint; and
   dynamically readjust the priority of the resource reservation request in real-time in response to changes in the mission.

15. The first node of claim 9, wherein the circuitry configured to determine comprises circuitry configured to:
   set the reserved bandwidth equal to the offered rate if the offered rate is less than the reserved bandwidth;
   send a notification to the second node with a value of the reserved bandwidth;
   restore the originally offered rate if the third node indicates a failure to reserve the bandwidth; and
   remove the third node from the set of eligible nodes if the third node indicates a failure to reserve the bandwidth.

16. An article comprising:
   a non-transitory computer-readable medium that stores computer-executable instructions, the instructions causing a machine to:
      receive, at a first node in a network, a resource reservation request from a second node in the network, wherein the resource reservation request is a request for bandwidth to satisfy a bandwidth requirement of a mission;

determine, at the first node, if there is an eligible node in the network that can be used to reach a destination and meet the resource reservation request, wherein the eligible node is capable of:

reaching the destination directly or indirectly, satisfying a resource constraint of the mission, the resource constraint comprising at least one of jitter, latency or security and satisfying the bandwidth requirement of the mission; and notify the second node a result of the determining comprising notifying the second node of a latest offered rate if the first node is an eligible node, wherein the offered rate is a bandwidth which the eligible node will reserve for the mission.

17. The article of claim 16, wherein the instructions cause the machine to determine comprises instructions causing the machine to:

store the resource constraint of the resource reservation request at the first node;

select a third node in the network from a set of eligible nodes with the largest reserved bandwidth;

set the reserved bandwidth to be the minimum of currently reserved bandwidth and a current offered rate;

set an offered rate of the resource reservation request equal to the reserved bandwidth; and forward the resource reservation request to the third node.

18. The article of claim 17, further comprising instructions causing the machine to:

receive, at a third node in the network, a resource reservation request from a first node in the network;

determine, at the third node, if there is an eligible in the network that can meet the resource reservation request; and notify the first node a result of the determining.

19. The article of claim 18, further comprising instructions causing the machine to:

receive notification that a link is degraded or has failed;

perform a resource re-evaluation;

reduce bandwidth if the mission may be still completed using the link;

cancel the reserved bandwidth if another route is not available and if the mission may not be completed using the link;

notify the second node and the third node of the bandwidth change;

determine if there is bandwidth to perform the mission;

determine if the mission may be completed using a lower bandwidth than previously reserved if there is not bandwidth to perform the mission; and seek an alternate route if the mission may not be completed using a lower bandwidth.

20. The article of claim 16, further comprising instructions causing the machine to:

establish a priority for the resource reservation request based on the resource constraint; and dynamically readjust the priority of the resource reservation request in real-time in response to changes in the mission.

* * * * *